United States Patent [19]

Smith et al.

[11] 3,866,463

[45] Feb. 18, 1975

[54] DEVICE FOR TESTING THE TORQUE REQUIRED TO RELEASE A SCREW CAP FROM ITS TIGHTENED POSITION

[75] Inventors: David A. Smith, Philadelphia, Pa.; Werner L. Tollefsbol, Delran, N.J.

[73] Assignee: SmithKline Corporation, Philadelphia, Pa.

[22] Filed: Nov. 19, 1973

[21] Appl. No.: 416,930

[52] U.S. Cl. .................... 73/99, 73/88 F, 73/136 R
[51] Int. Cl. .............................................. G01l 5/00
[58] Field of Search .... 73/133 R, 136 R, 139, 88 B, 73/88 F, 99, 101

[56] References Cited
UNITED STATES PATENTS

| | | | |
|---|---|---|---|
| 2,279,698 | 4/1942 | Weckerly | 73/99 |
| 2,300,288 | 10/1942 | Hullhorst | 73/136 R |
| 2,337,951 | 12/1943 | Whitehead | 73/99 |
| 2,705,416 | 4/1955 | Thomas | 73/1 C |
| 3,026,721 | 3/1962 | Ensor et al | 73/101 |
| 3,122,915 | 3/1964 | Haller | 73/99 |

*Primary Examiner*—Charles A. Ruehl
*Attorney, Agent, or Firm*—Smith, Harding, Earley & Follmer

[57] ABSTRACT

A rotary bottle support is adapted to hold and rotate a bottle, the cap of which is held against rotation. A gear and rack arrangement is actuated by a ram to rotate the bottle support to loosen the bottle cap. An air supply line is connected to a control valve which in turn is connected by a second line to one side of the ram and by a third line to the other side of the ram. A fluid actuated second ram controlling a pressure regulator in the second line to gradually increase the pressure delivered to the first ram is connected to a third line containing a restrictor and which in turn is connected to the second line on the upstream side of the pressure regulator. A fourth line connects the other side of the first ram to the control valve. A solenoid actuates the control valve to connect the second line to the air supply line and the fourth line to the atmosphere to provide for a gradually increased pressure on the first ram to move it from a starting position to rotate the bottle support and loosen the cap. A pressure gauge is subject to the pressure on the ram to loosen the cap to indicate the torque required to loosen the cap. After the cap is loosened, the movement of the first ram energizes a solenoid which shifts the control valve back to its original position to connect the fourth line to the air supply line and the second line to the atmosphere to return the first ram to its starting position. A third ram exerts downward pressure on the top of the cap during the unscrewing operation.

5 Claims, 7 Drawing Figures

3,866,463

DEVICE FOR TESTING THE TORQUE REQUIRED TO RELEASE A SCREW CAP FROM ITS TIGHTENED POSITION

BACKGROUND OF THE INVENTION

It is well known to use a conventional torque tester to test the torque required to remove a screw type bottle cap to insure that the purchaser can satisfactorily loosen the cap. The necessity for such testing has greatly increased incident to the extensive use today of safety caps designed to be difficult for small children to remove. Typical of such caps are the type requiring downward pressure to permit the cap to be unscrewed. With this type of cap the testing of the torque necessary to loosen the cap must be combined with a downward pressure on the top of the cap to permit it to be unscrewed. Conventional torque testing equipment lacks the capability of testing large quantities of bottle caps with rapidity and lacks the capability of testing screw caps where a downward pressure must be exerted to permit unscrewing.

SUMMARY OF THE INVENTION

A device for testing the torque required to release a screw cap from its tightened position has a rotary container support for supporting and rotating a container and means to hold the container cap against rotation. Means including a fluid actuated first ram is adapted to rotate the container support. Air supply means supplies air at a gradually increasing pressure to one side of the ram to move the ram from a starting position to rotate the container support to loosen the cap. Pressure actuated means communicating with said one side of the ram indicates the torque applied to the rotary container support. Means actuated by the ram returns the ram to its starting position after the cap has been loosened from its tightened position. When pressure on the top of the screw cap is required to permit it to be loosened from its tightened position, pressure means exerts a predetermined downward pressure on the top of the container cap.

DETAILED DESCRIPTION

Figure 1:
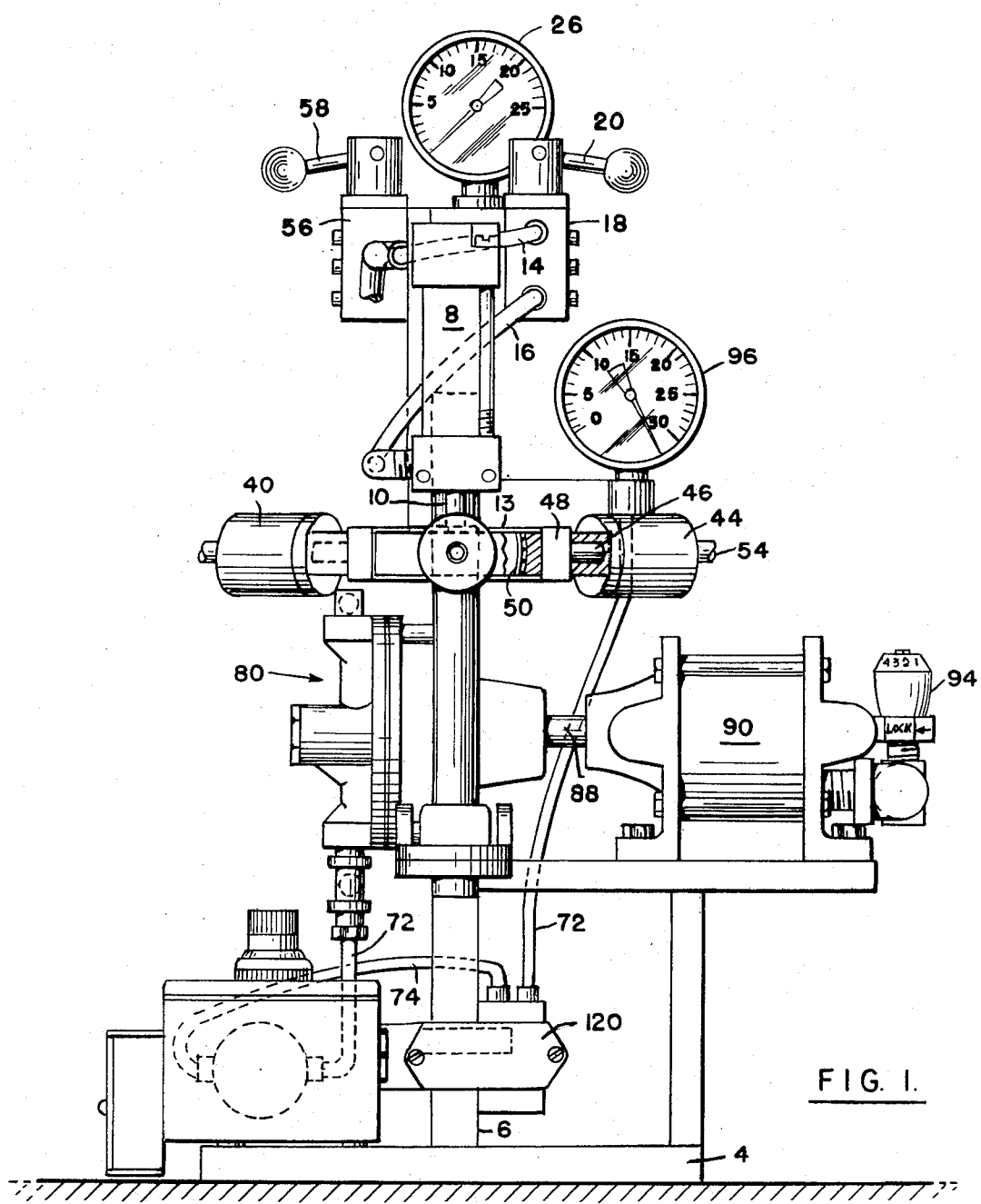
FIG. 1 is a front elevation of a device in accordance with the invention.
Figure 2:
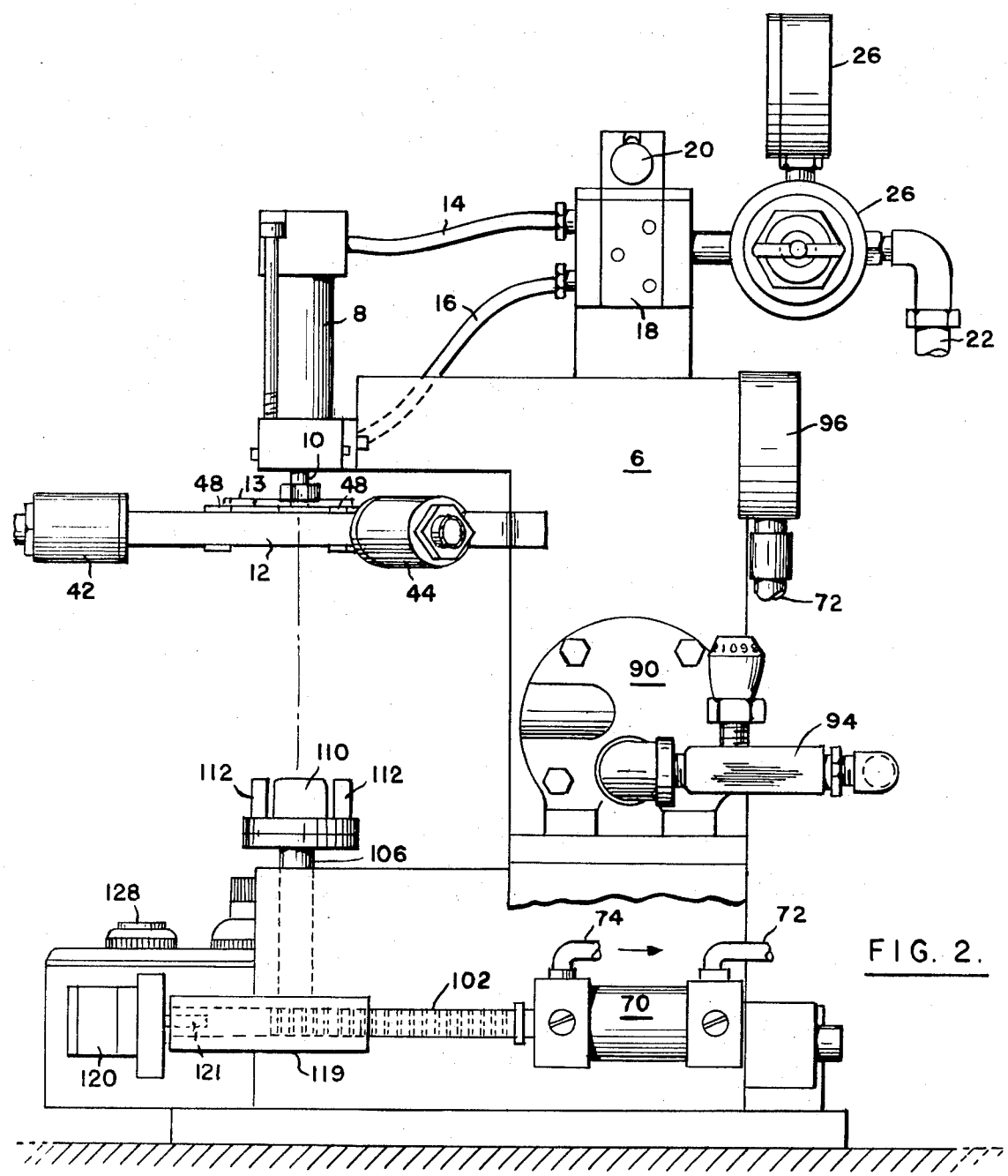
FIG. 2 is a right side elevation of the device of FIG. 1.
Figure 3:
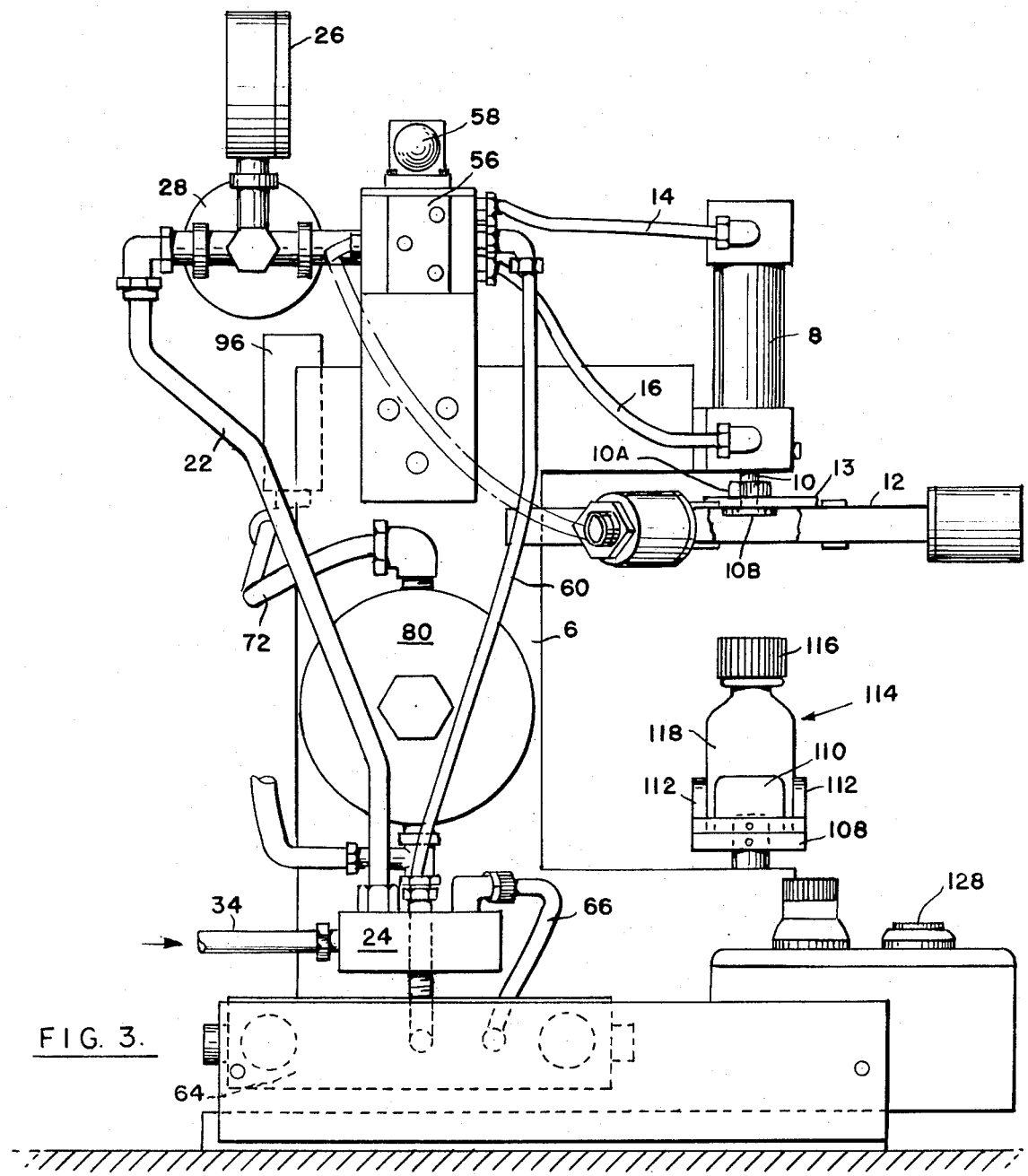
FIG. 3 is a left side elevation of the device of FIG. 1.
Figure 4:
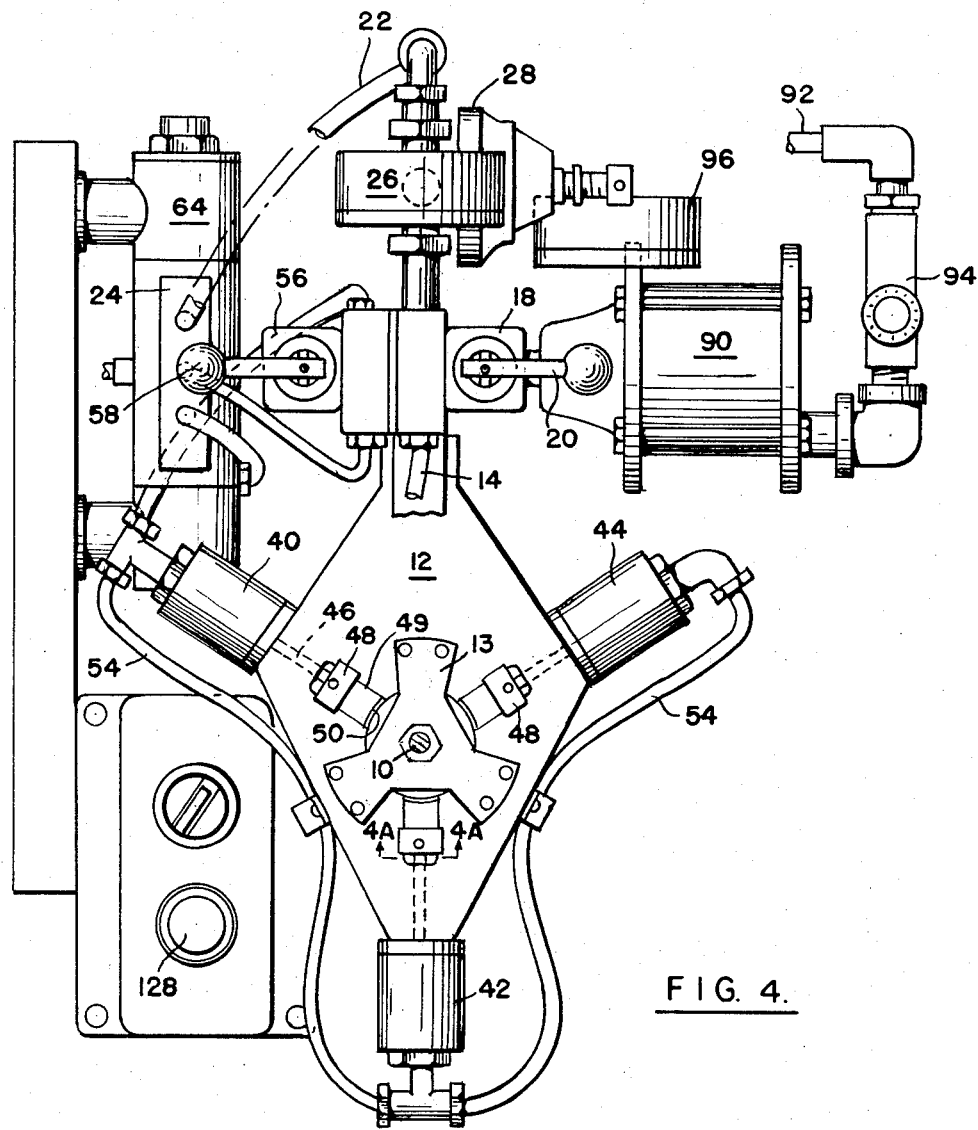
FIG. 4 is a top plan view of the device of FIG. 1, partially broken away.
Figure 4A:
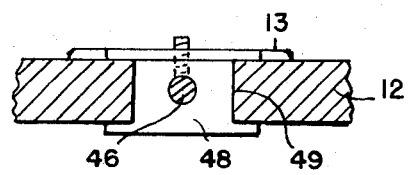
FIG. 4A is a vertical section taken on the plane indicated by the line 4A—4A in FIG. 4.
Figure 5:
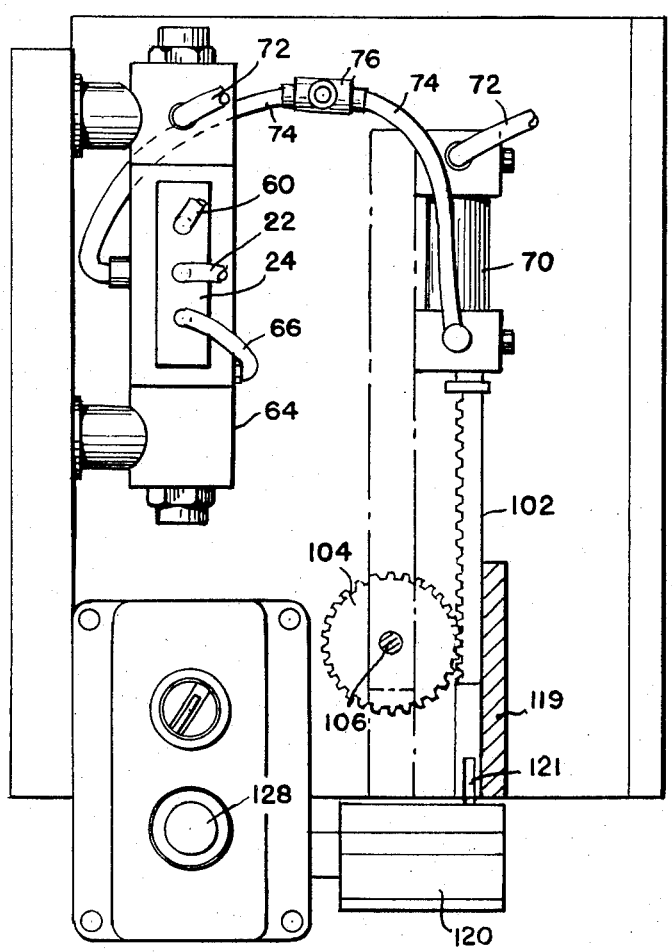
FIG. 5 is a sectional view taken on the plane indicated by the line 5—5 in FIG. 1.
Figure 6:
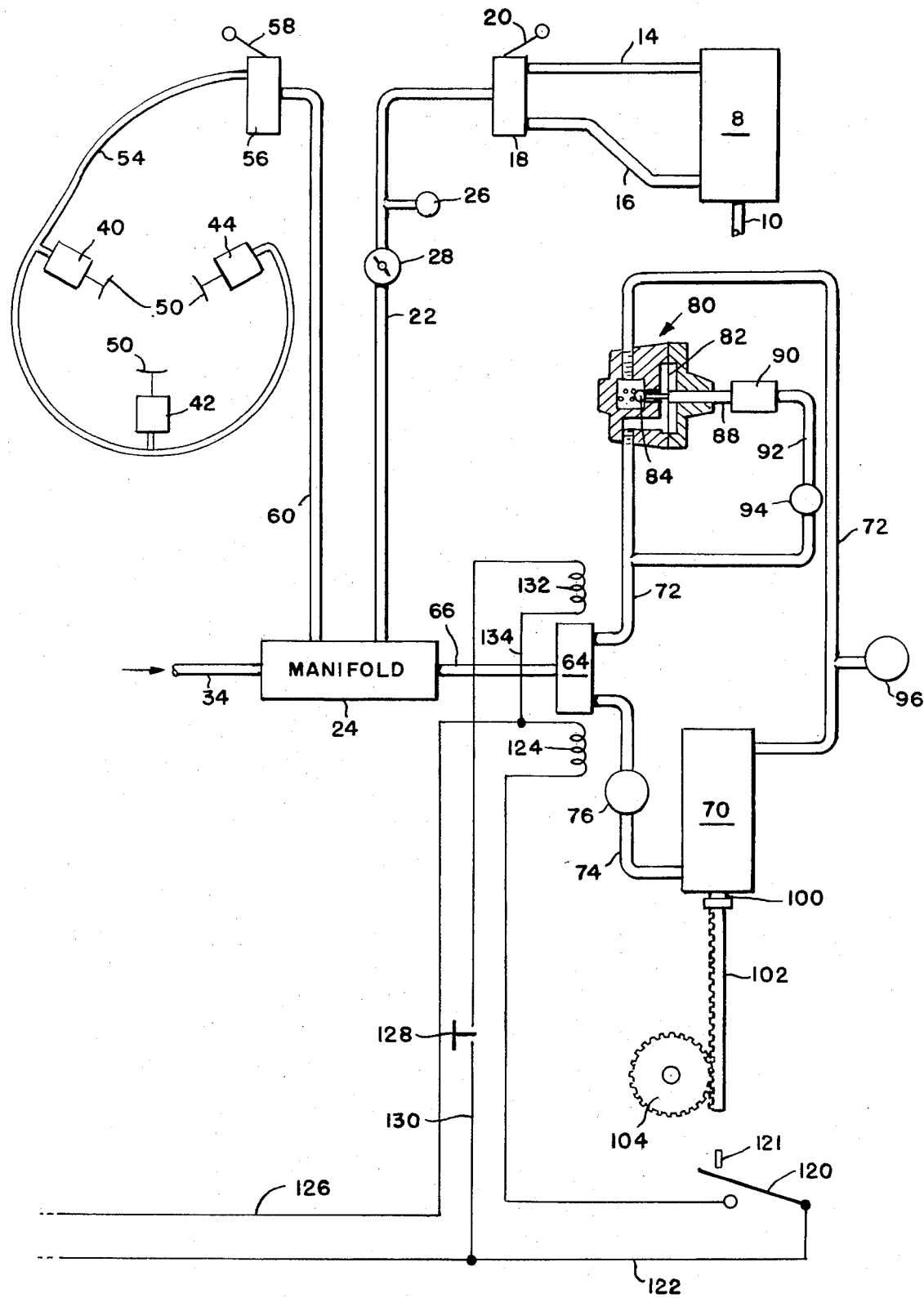
FIG. 6 is a schematic diagram of the principal operative parts of the device of FIG. 1.

A device 2 in accordance with the invention has a base 4 and a standard 6 supported by base 4. A vertically disposed ram 8 is secured to standard 6 and has a rod 10 connected to a chuck plate 12 through an intermediate plate 13 to which rod 10 is secured by threading. A nut 10A threaded to rod 10 locks the plate 13 in the desired position. A resilient pad 10B is secured to the bottom of plate 13 to engage a bottle cap.

A line 14 is connected to one side of ram 8 and to valve 18 and a line 16 is connected to the other side of ram 8 and also to valve 18 which has a control lever 20. Valve 18 is connected by line 22 to a manifold 24. A pressure gauge 26 and a pressure regulator 28 are connected in line 22. Manifold 24 is supplied with air under pressure by a line indicated at 34. Valve 18 alternatively connects line 14 to line 22 and line 16 to the atmosphere or line 16 to line 22 and line 14 to the atmosphere.

Chuck plate 12 has secured thereto rams 40, 42 and 44 which are 120° apart and each of which has a rod 46 connected to a slide 48 engaging a slot 49 in plate 12 and carrying an arcuate faced chuck member 50. An air line 54 is connected to each of the rams 40, 42 and 44 and to a valve 56 having a manual control lever 58. Valve 56 is connected by a line 60 to manifold 24. Rams 40, 42 and 44 are spring biased to withdraw the rods 46 when the line 54 is connected to the atmosphere through valve 56.

One side of a ram 70 is connected to a solenoid control valve 64 by a line 72 and the other side by a line 74 which contains a restrictor 76. Control valve 64 is provided with air under pressure by line 66 from manifold 24. A conventional pressure regulator 80 having a spring-biased diaphragm 82 connected to a ball valve 84 is placed in line 72. Rod 88 of ram 90 engages the diaphragm to control the output pressure. Ram 90 is connected by a line 92 containing a restrictor 94 to line 72 on the upstream side of pressure regulator 80. With the device 2 at rest, ram 90 through lines 92 and 72 and control valve 64 is connected to the atmosphere and rod 88 is spring biased to the withdrawn position to fully close ball valve 84. A pressure gauge 96 is connected to line 72 between pressure regulator 80 and ram 70.

Rod 100 of ram 70 is connected to a rack 102 which in turn is connected to a gear 104 fixedly secured to a shaft 106 mounted for rotation in standard 6. A bottle support member 108 is provided with side support members 110, 110 and 112, 112 to engage the sides of a bottle 114 having a screw cap 116 and a body 118 to prevent the rotation of body 118 relative to bottle support 108. Rack 102 is supported for sliding movement by a support indicated at 119. Rack 102 is adapted to actuate normally open plunger switch 120 having a plunger 121 and which is spring biased in the open position and is in line 122 of a 115 volt power system. Line 122 is connected to one side of a solenoid 124 of control valve 64, the other side of which is connected to a second line 126 of the 115 volt system. A normally open switch 128 spring biased in the open position is in line 130 which is connected to line 122 and to one side of a second solenoid coil 132 in control valve 64, the other side of which is connected by a line 134 to line 126.

OPERATION

In operation, a bottle 118 is placed on bottle support 108 and valve control lever 20 is shifted to introduce air into ram 8 to lower resilient pad 10B onto cap 116 and position chuck members 50 opposite the cap 116. The diameter of pad 10B is slightly less than that of cap 116 to avoid interfering with chuck members 50. Valve lever 58 is then shifted to cause the introduction of air into rams 40, 42 and 44 to cause the chuck members 50 to engage cap 116 and hold it against rotation. If cap 116 is of the type which requires a predetermined downward pressure to be exerted thereon before it can be loosened, this predetermined pressure is applied by ram 8 by adjusting the adjustable pressure regulator 28 to provide the desired line pressure as indicated on gauge 26. Switch 128 is now momentarily actuated to energize solenoid coil 132 and shift control valve 64 to connect line 74 to the atmosphere and line 72 with air under pressure. Before the commencement of this operation, line 72 has been connected to the atmosphere and ram 90 is spring biased so that ram rod 88 has regulator 80 with its ball valve 84 in the fully closed position. As line pressure is introduced into line 72 it flows through restrictor 94 and gradually builds up pressure in ram 90 and urges ram rod 88 into regulator 80 to open ball valve 84 to supply gradually increasing pressure in ram 70. As pressure builds up in ram 70, it attempts to urge rack 102 to rotate gear 104 and bottle support 108 which is resisted by cap 116 which is being held against rotation by chuck members 50. When the torque exerted on bottle 118 is sufficient, cap 116 will be loosened from the bottle permitting rack 102 to rotate gear 104 and advance to move plunger 121 and close switch 120. The loosening of cap 116 is abrupt causing rapid movement of rack 102 and an indicated pressure drop on gauge 96, with the highest pressure being noted by the operator. The closing of switch 120 energizes solenoid coil 124 to shift control valve 64 back to its original position connecting line 72 to the atmosphere and providing air under pressure to line 74 to return ram 70 and rack 102 to its original position.

In the specific device described above it is desired that the gauge 96 indicate in inch pounds the torque applied to loosen cap 116. Therefore, ram 70 is provided with a piston having a one square inch head area and the gear 104 is given a one inch pitch radius. Gauge 96 is calibrated in pounds per square inch. Thus, when the operator notes the highest reading on gauge 96 just before the pressure drop resulting from the loosening of screw cap 116, the operator reads on gauge 96 the torque in inch pounds which was required to loosen the cap 116. If the torque read is within acceptable limits the bottle is accepted, if not it is rejected.

In any event, after the reading on gauge 96 is observed and ram 70 has been retracted, valve lever 58 is shifted to its original position connecting line 54 to the atmosphere and causing spring return rams 40, 42 and 44 to move chuck members 50 away from cap 116. Lever 20 is then shifted to its original position causing valve 18 to connect line 14 to the atmosphere and line 16 to air under pressure causing ram rod 10 carrying chuck plate 12 to be moved upwardly clear of bottle 118 which then can be removed.

It will be understood that the above described embodiment is illustrative and is not intended to be limiting.

We claim:

1. A device for testing the torque required to release a screw cap from its tightened position on a container comprising:

a rotary container support for rotating a container, means to hold a cap on said container against rotation, a fluid actuated ram, means to connect the ram to the container support for the rotation of said support, means to supply air at a gradually increasing pressure to one side of the ram to move the ram from a starting position to rotate the container support to loosen the cap, means actuated by the ram to return the ram to its starting position after the cap has been loosened, and means to indicate the torque applied to the rotary container support, said last-mentioned means being pressure actuated.

2. A device in accordance with claim 1 having means to exert a predetermined downward pressure on the top of the container cap.

3. A device in accordance with claim 1 in which the means to supply air to the ram includes a pressure regulator and means to control the pressure regulator to vary the pressure supplied to the ram.

4. A device for testing the torque required to release a screw cap from its tightened position on a container comprising:

a rotary container support for rotating a container having a screw cap, means to hold the screw cap against rotation, means including a fluid actuated first ram to rotate the container support to loosen the screw cap, a control valve, an air supply line connected to control valve, a second line connecting one side of the ram to the control valve, a pressure regulator in said second line, pressure actuated means in said second line downstream of the pressure regulator to indicate the torque applied to the rotary container support, a second fluid actuated ram controlling the pressure regulator, a third line connecting the second ram to the second line on the upstream side of the pressure regulator, a restrictor in said third line providing for a gradual increase in pressure in the second ram when air under pressure is introduced into the third line, a fourth line connecting the other side of the first ram to the control valve, means to actuate the control valve to connect the second line to the air supply line and the fourth line to the atmosphere, means actuated by the first ram after the cap is loosened to shift the control valve back to its original position to connect the fourth line to the air supply line and the second line to the atmosphere to return the first and second rams to their original positions.

5. A device in accordance with claim 4 having means to exert a predetermined downward pressure on the top of the cap.

* * * * *